United States Patent [19]

McLaughlin

[11] Patent Number: 5,541,820
[45] Date of Patent: Jul. 30, 1996

[54] COMBINED LAMP AND MOVIE PROJECTOR

[76] Inventor: Michael K. McLaughlin, 1013 8th St., St. Laurel, Md. 20707

[21] Appl. No.: 378,611

[22] Filed: Jan. 26, 1995

[51] Int. Cl.⁶ ............................................. F21V 33/00
[52] U.S. Cl. ........................ 362/253; 362/410; 362/414; 362/234; 362/294; 362/226; 352/202; 352/136; 352/203
[58] Field of Search ................................. 362/234, 253, 362/410, 414, 226, 3, 8, 294, 373, 431, 457, 396; 352/244, 242, 203, 136, 134, 202

[56] References Cited

U.S. PATENT DOCUMENTS

| | | | |
|---|---|---|---|
| 1,496,409 | 6/1924 | Dilione | 352/203 |
| 2,242,464 | 5/1941 | Githens et al. | 352/202 |
| 2,440,966 | 5/1948 | Moomaw | 352/202 |
| 3,593,019 | 2/1970 | Martinez | 362/294 |

Primary Examiner—Denise L. Gromada
Assistant Examiner—Thomas M. Sember
Attorney, Agent, or Firm—Eli Lieberman

[57] ABSTRACT

A film movie projector and table lamp are combined so as to serve as a lamp, a projector, or both. A table lamp is supported on a support tube extending upwardly from the lamp chamber of the projector. The lamp can be wired to utilize the internal power supply of the projector by means of specifically designed electrical connectors.

20 Claims, 8 Drawing Sheets

5,541,820

COMBINED LAMP AND MOVIE PROJECTOR

BACKGROUND OF THE INVENTION

This invention relates to a combined lamp and movie projector integrally related so as to function as an operative lamp and operative movie projector.

The development of the electronic video camcorder in recent years has rendered obsolete the home movie industry based on photographic film. That industry flourished from the turn of the century until the 1980s, during which millions of movie cameras and projectors were built and countless reels of film taken.

Because of the convenience attached to viewing motion pictures through a VCR and television set, it has become popular to electronically transfer the images from photographic film to a magnetic tape. In such an image transfer there is a loss in resolution which is far outweighed by the convenience of the magnetic tape format. A more serious question concerns the longevity of the magnetic tape format as compared to photographic film. Many experts believe that photographic film will outlast magnetic tape, and owners of old photographic reels are urged to retain them stored in a cool dry environment.

During the period which extended from approximately 1930 to 1950 a particular design of a pedestal supported motion picture projector was developed in the United States and gained wide popularity. This projector was of pleasing design and constructed of durable material to maintain its appearance even after some 60 years. Although replaced by the VCR, because of their artistic design and superb workmanship, thousands of these projectors were retained by their owners and kept in storage.

The motivation behind this invention was to add a new function to the above described pedestal supported projector to justify a place in the American living room. That goal was acheived by combining it with a lamp.

SUMMARY OF THE INVENTION

The overall object of the present invention is to combine a particular type of pedestal supported motion picture projector with a table lamp.

It is another object of the invention to support the table lamp at the top of the vertical lamp chamber of the projector.

It is a specific object of the invention to modify a conventional two slot socket adapter to fit the bayonet type electrical assembly within the lamp chamber to supply power to the table lamp. It is yet another object of the invention to modify or replace the top cap of the lamp chamber to receive a table lamp support.

DESCRIPTION OF THE PREFERRED EMBODIMENTS

Figure 1:
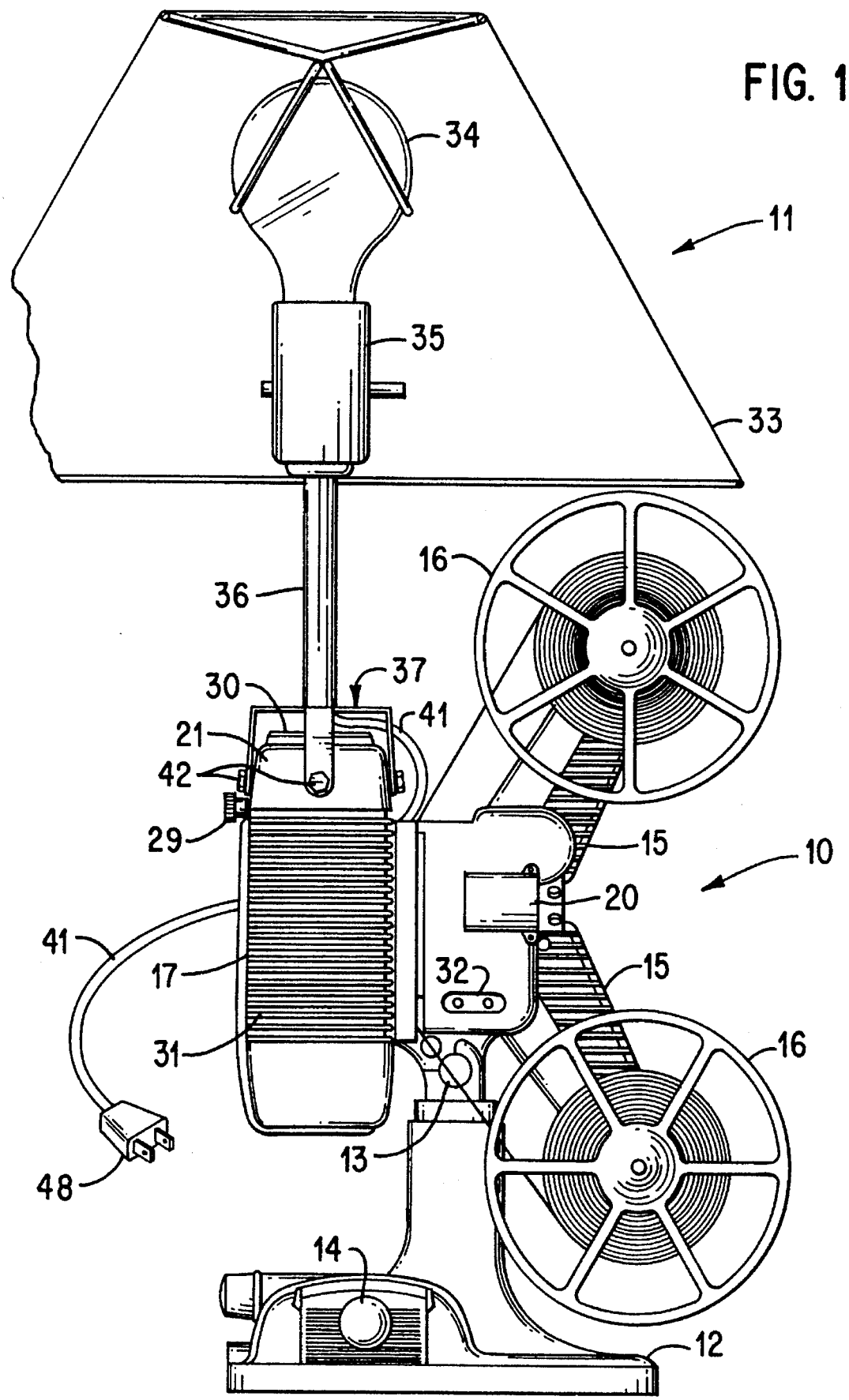
FIG. 1 is a side view of the combined motion picture projector and table lamp, the projector being shown in part schematic form.
Figure 2:
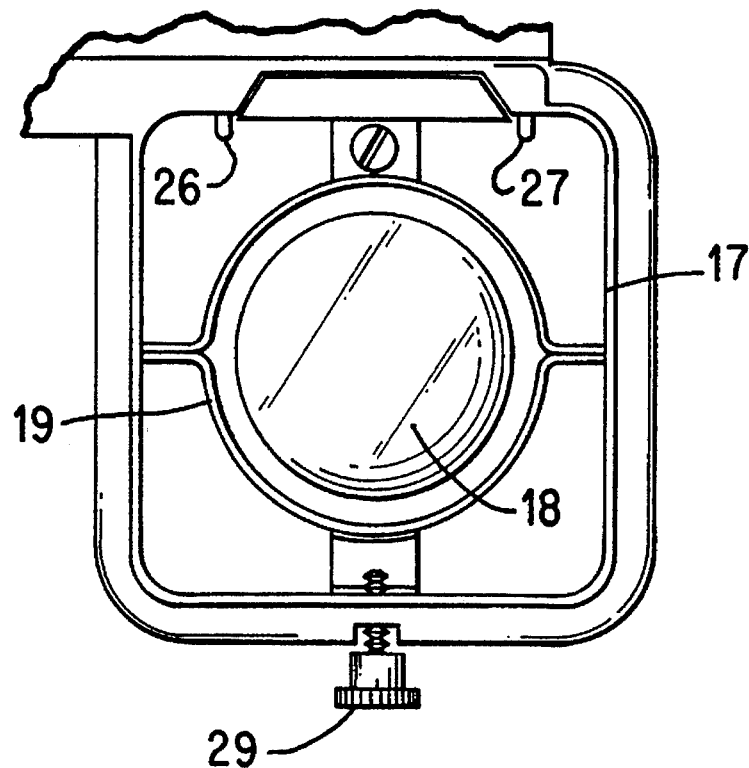
FIG. 2 is a view looking down into the lamp chamber with the top cover removed.
Figure 3:
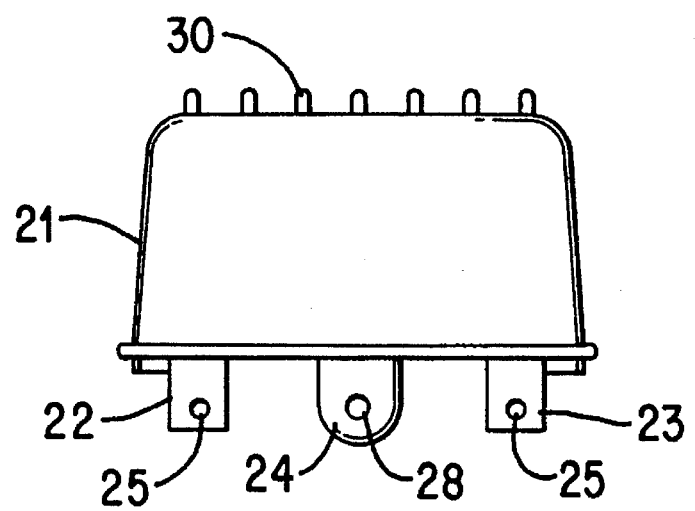
FIG. 3 is a perspective view of the top cover and the lugs to attach the cover to the top of the lamp chamber.
Figure 4:
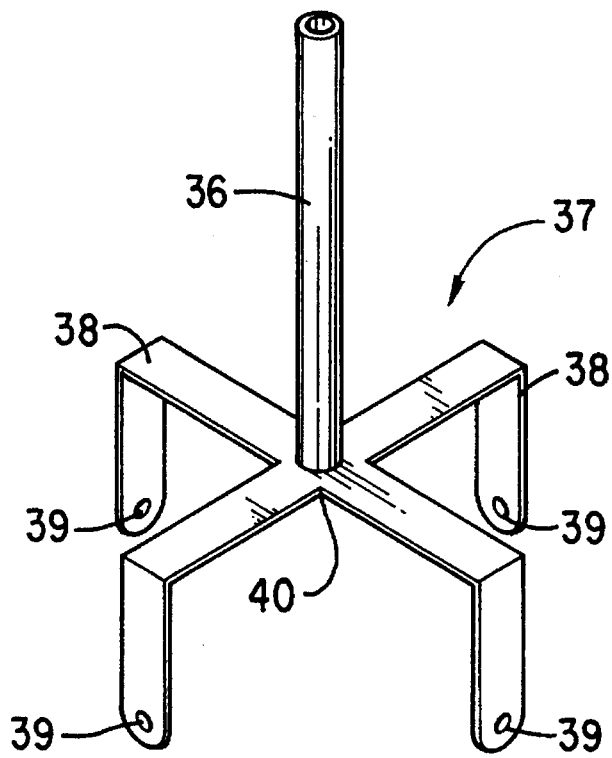
FIG. 4 is a perspective view of the claw which supports the lamp.

Referring now in general to the drawings and in particular to FIGS. 1–3, the novel table lamp and motion picture projector of this invention comprises a projector 10 supporting a lamp 11. The projector 10 is of a type developed in the United States in the early thirties and produced and sold in large numbers by such companies as Bell & Howell, Keystone, Kodak, DeJur, and Revere. While the many models of these projectors differ in mechanical details of the lens system and the film transport, the overall design of these projectors is sufficiently similar for the purposes of this invention.

The projector 10 is supported on a pedestal 12 in a generally vertical position by means of a pivotal connection at 13. A knob 14 controls a linkage, not shown, within the pedestal to effect a pivotal adjustment of the projector around the pivotal connection. However, for purposes of this invention, the projector is maintained in a vertical position.

The projector carries a pair of arms 15 which carry film reels 16 at end portions for moving stored film through the projector by a motor and sprocket drive (not shown) in a well known manner.

A lamp chamber 17 is mounted on the projector opposite the arms 15 to extend in a vertical direction. The chamber can be square, rectangular or circular in cross section. A projection lamp 18 is mounted within a heat shield 19 centered in the lamp chamber to make electrical contact with an electrical connector situated at the base of the lamp chamber. The lamp projects a beam of light through the film and is focused by a lens system at 20.

A cap 21 is secured to the top of the lamp chamber 17 by means of depending lugs 22, 23, and 24. Lugs 22 and 23 mounted on a wall of cap 21 have holes 25 which receive pins 26 and 27, respectively, extending from a wall of the lamp chamber. When so positioned on the lamp chamber, lug 24 depending from an opposite wall of cap 21 has a threaded opening 28 which receives a thumb screw 29 to firmly lock the cap to the lamp chamber as shown in FIG. 1. While a specific cap fastening means involving depending lugs 22, 23, 24 is shown, it should be understood that other projectors may have different cap fastening arrangements.

The cap 21 has a series of ,slats 30 on its top surface to permit air supplied by a blower (not shown) to pass over the projection lamp. A series of heat transfer fins 31 on the lamp chamber also aid in dissipating the heat developed by the projection lamp.

A recessed electrical receptacle 32 with two male prongs is provided on the projector to receive a separable electric extension cord. However, some projectors are directly wired.

Lamp 11 comprises a shade 33, a bulb 34, a socket switch 35 and a hollow support tube 36 which is welded or brazed to a claw 37 which fits over and is attached to cap 21. Claw 37 is formed of two crossed U-shaped members 38 which are joined at a medial crossing point. The legs of the U-shaped members are provided with holes 39 at lower end portions. The claw 37 is formed with an opening 40 registering with the opening of the support tube 36 to permit the lamp cord 41 to extend therefrom as shown in FIG. 1.

In assembling claw 37 to cap 21, the cap is removed from the lamp chamber and inserted within the grip of the arms 38 with a friction fit. Holes are then drilled into the cap through holes 39 in claw 37, and the claw and cap are secured together by four small nuts and bolts 42 or any other suitable fastening devices.

Instead of using the original cap supplied with the projector and having to drill holes in it, a duplicate cap may be fabricated and joined within the arms of the claw 37 in any suitable manner. In both situations, the claw does not block the discharge of cooling air exiting the slats 30.

As can be seen in FIG. 1, the lamp and projector, while integrally combined, can be separately or jointly operated. The lamp can be used independently as a table lamp, or used in combination with the projector as a source of light to make any adjustments on the projector while it is in operation.

The embodiment of the invention shown in FIGS. 1–4 is based on one particular design of projector. However, it should be understood that the shape of the support claw can be modified to fit the caps of other projectors including rectangular, round, and oval shape. Also, a special replacement cap can be fabricated to carry the support tube directly without the use of a claw.

Figure 5:
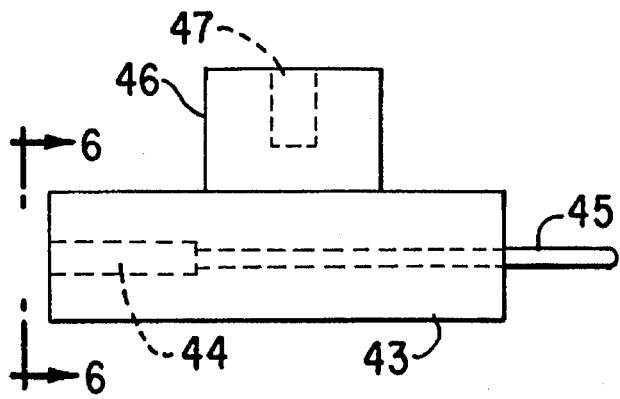
FIG. 5 is a side view of an electrical cord adaptor usable with the invention.
Figure 6:
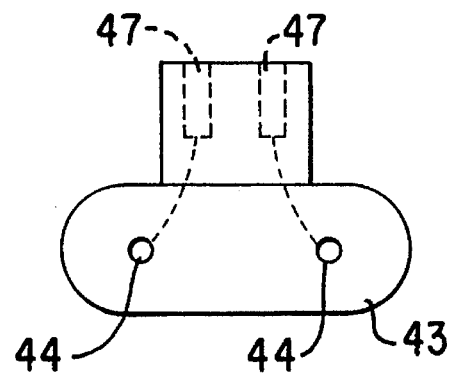
FIG. 6 is an end view looking in the direction of lines 6—6 of FIG. 5.

FIGS. 5 and 6 show an electrical adapter that can be used to supply power to the table lamp from the electrical cord of the projector in those models having a separable lamp cord as in FIG. 1. The adapter is formed of a shaped insulating body 43 having a cross sectional area to fit within electrical receptacle 32. Embedded within the insulated body are a pair of conductors having tubular sections 44 terminating at one end and cylindrical prongs 45 extending outwardly from the body at the other end. An insulated block 46 extends upwardly from a medial portion of body 43. Embedded in block 46 are a pair of internal contacts 47 to receive a conventional pin plug such as shown at 48 in FIG. 1. Each contact 47 is electrically connected to one of the prongs 45.

In use, the body 43 is inserted within receptacle 32 on the projector with the tubular sections 44 telescoped over the male prongs of the receptacle. The female end of the projector cord is then inserted over prongs 45 of the adapter and the pin plug 48 is inserted into contacts 47 in block 46 to complete the installation.

The advantage in using the adapter is that only one power cord is needed and the line from the table lamp can be shortened to reduce unsightly extension cord visibility.

Figure 7:
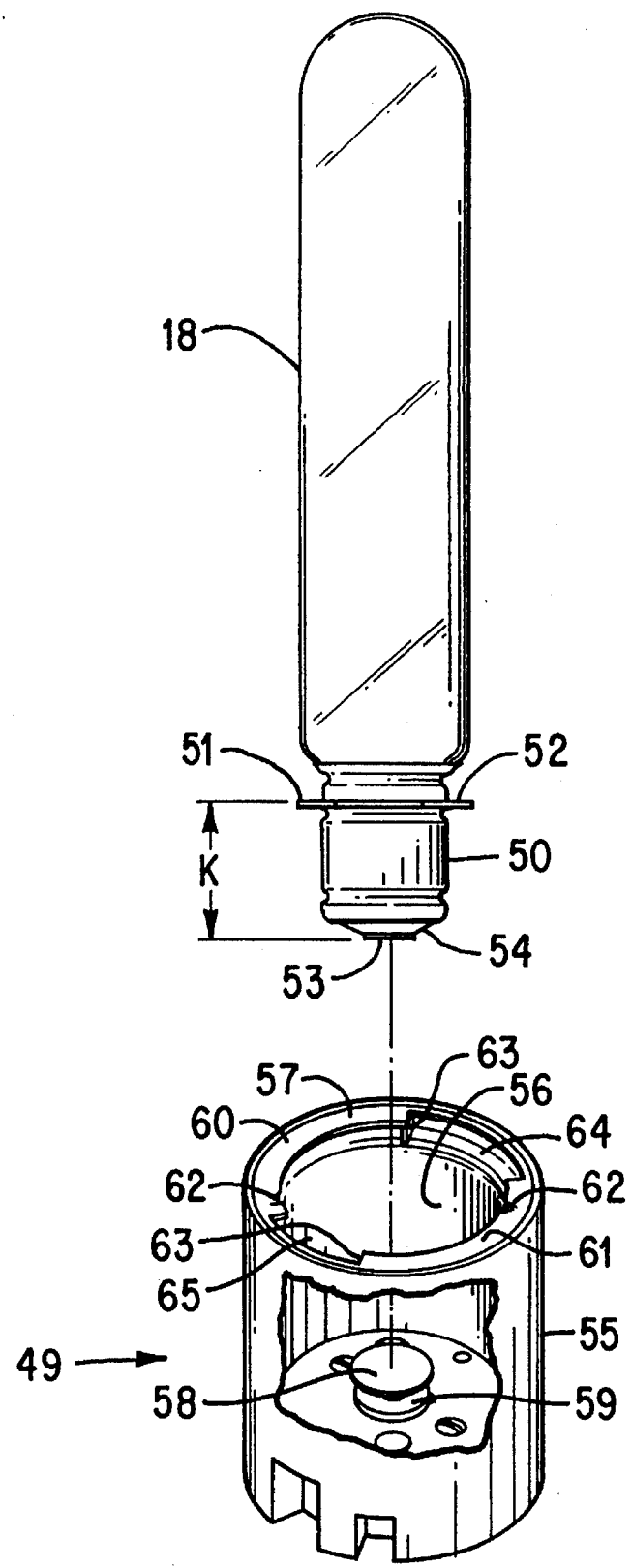
FIG. 7 is a view illustrating the manner of attachment of a bayonet type projector lamp with its receptacle.
Figure 8:
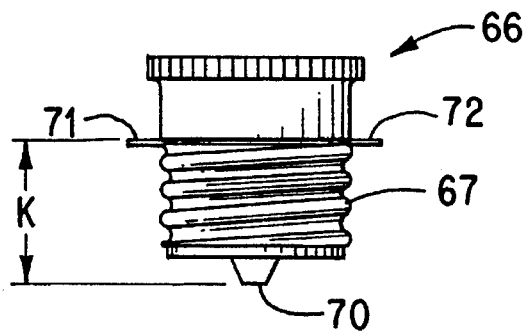
FIG. 8 is a modified electrical socket adaptor for insertion in the electrical receptacle of FIG. 7 in lieu of the projection lamp.
Figure 9:
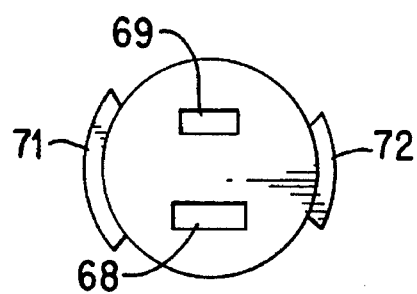
FIG. 9 is a top view of FIG. 8.

FIGS. 7–9 show an embodiment of the invention wherein the power for the lamp 34 is derived from the projecting lamp socket 49 mounted on the bottom of the lamp chamber. The advantage here is that the table lamp may present a more pleasing appearance since the feed cable 41 is not visible and the lamp mounting bracket may take many different shapes. The disadvantage is that parts must be removed and exchanged to place the projector in operation. FIG. 7 shows the prior art connection of the projection lamp 18 with the electrical receptacle 49. The lamp is formed with a bayonet connection comprising cylindrical shell 50 with two arcuate flanges 51 and 52 extending outwardly from an upper portion of the shell with flange 51 extending through a greater arc than flange 52. The shell and flanges form one electrical feed for the lamp. A contact 53 insulated from the shell by an insulating ring 54 forms the other electrical feed.

Electrical bayonet receptacle 49 comprises an insulated cylinder 55 containing a conductive cup 56 with a special top rim structure 57. A spring urged contact 58 is mounted at the center of the conductive cup bottom and insulated therefrom by insulating ring 59. Contact 58 is biased to extend upwardly from the cup bottom.

Top rim structure 57 is formed with two arcuate overhanging sections 60 and 61. Each section has an indentation 62 extending below its surface near an end portion thereof and a stop member 63 at the other end. Rim openings 64 and 65 separate overhanging sections 60 and 61.

To electrically connect the projection lamp 18 to the receptacle 49, the lamp is placed in the cup 56 and pushed downwardly, depressing spring urged contact 58. In this position, flanges 51 and 52 clear stops 62. The projection lamp is then turned until the flanges engage stop members 63. The above described operation is conventional in attaching a bayonet bulb to its socket.

FIGS. 8 and 9 show applicant's novel fixture allowing receptacle 49 to receive a modified socket adaptor instead of a projection lamp. A conventional socket adaptor 66 with a standard thread 67 to screw into a standard bulb socket as shown at 35 in FIG. 1 is modified to couple into a bayonet type receptacle as shown at 49. Socket adaptor 66 is provided with two slotted openings 68, 69 having internal electrical contacts to mate with the prongs of a conventional pin plug. One of the internal contacts is electrically connected to external central contact 70. Two flanges 71 and 72, are bonded to an upper portion of thread 67 in a spatial relationship similar to that found with flanges 51 and 52 on bulb 18 in FIG. 7. If thread 67 is aluminum, it is preferred to use aluminum flanges and aluminum soldering. However, the material of the flanges and the manner of attachment may take many forms.

The distance between the bottom of the flanges 71 and 72 and the tip of the central contact as shown at "k" in FIG. 8 is critical. When this distance is maintained similar to dimension "k" in FIG. 7, there will be sufficient pressure between contact 58 and overhanging flanges 60 and 61 to achieve good electrical contact. It should be noted that the threads 67 themselves are not used. Socket adaptor 66 was used because of its low cost and ready availability plus the simple modification added to convert it to a bayonet type connection.

Figure 10:
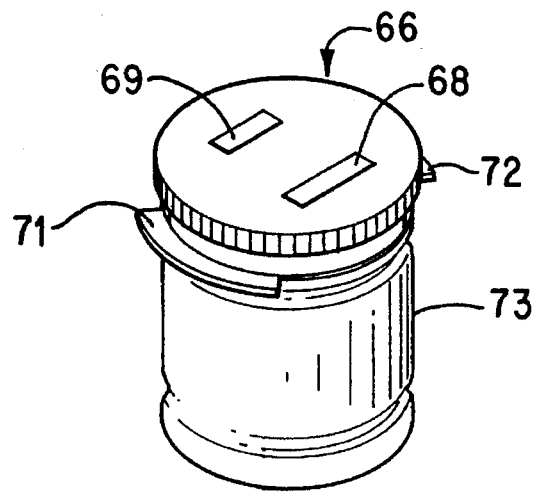
FIG. 10 is a modified socket adaptor.

FIG. 10 shows a modification of the socket adaptor 66 wherein a collar 73 having the flanges 71, 72 integral therewith is slipped over the threads 67 and bonded thereto or held in position by a force fit. The advantage here is in the simplicity in setting the dimension "k" and in improving the strength of the flanges. It should be understood that the FIG. 10 socket adaptor can be manufactured without the threads 67 which are not directly used in a bayonet connection. Instead of the threads, the socket adaptor may be made with a collar and flanges similar to the base of the lamp as shown in FIG. 7 at 50–52.

In operation, the modified socket adaptor 66 is inserted in bayonet receptacle 49 in the same manner described in connection with bulb 18. A source of power for a pin plug is now available directly from the projector as distinguished from the FIG. 1 embodiment where a separate lamp cord is provided. A pin plug at the end of a shortened lamp cord is plugged into the socket adaptor. The lamp cord in this situation extends directly into the lamp chamber through the cap structure.

Figure 11:
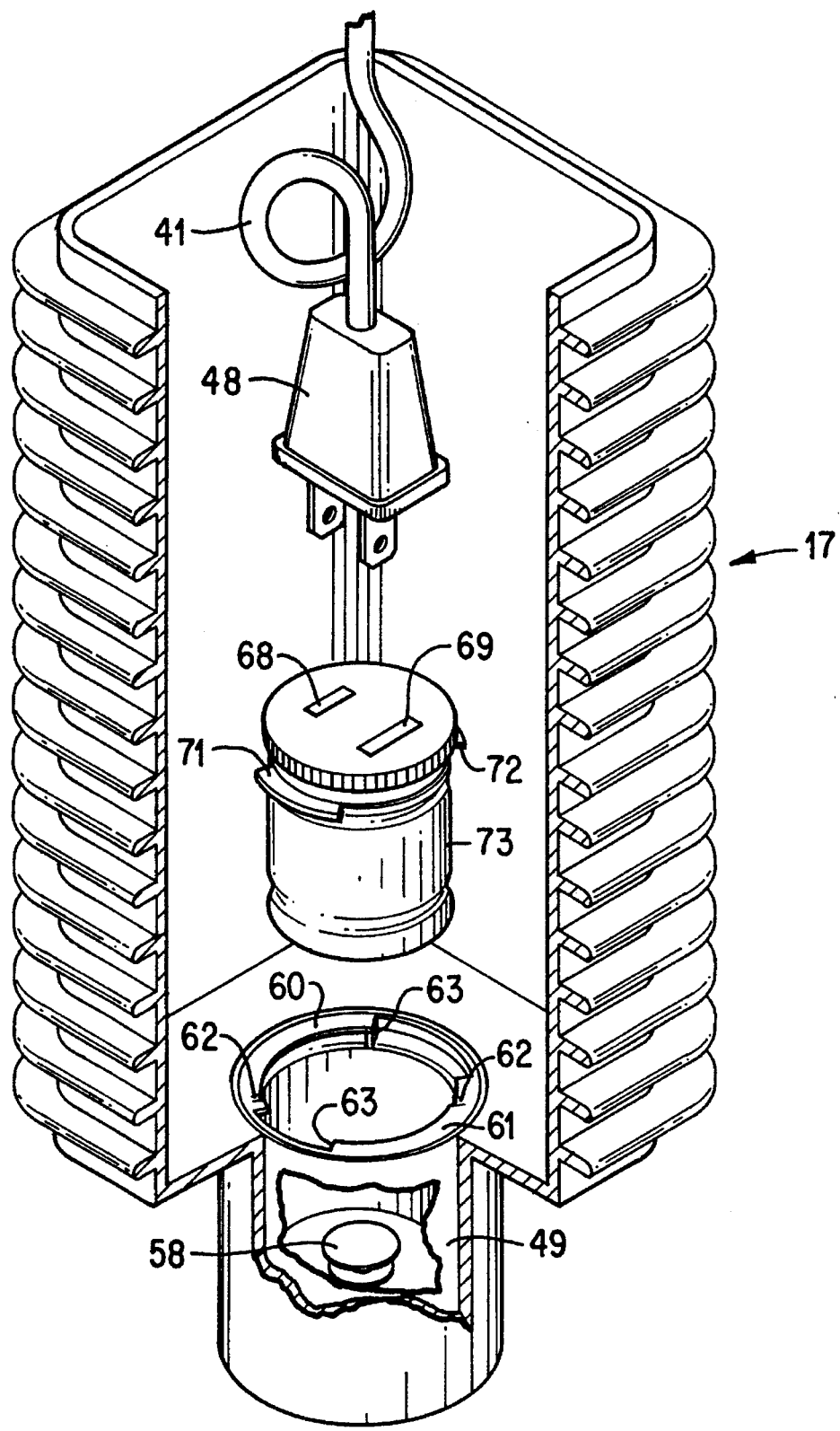
FIG. 11 is a cutaway and exploded view of the internal connection between bayonet socket 49 and a modified socket adapter.

FIG. 11 is a cutaway and exploded view of the internal connection between the bayonet socket 49, the modified socket adaptor 66 and the pin plug 48 at the base of lamp chamber 17. The same reference numerals used in FIGS. 7 and 8 will be used here to designate similar structure.

In operation, the modified socket adaptor 66 is inserted within bayonet socket 49 with sufficient force so that contact 70 depresses spring contact 58. This allows flanges 71 and 72 extending from collar 73 to be rotated within overhanging sections 60 and 61 and to be locked in position between stops 62 and 63 as explained in connection with FIGS. 7 and 8.

With the modified socket adaptor in place, pin plug 48 is inserted within contact openings 68, 69. Alternatively, the plug 48 can be inserted within the socket adaptor and the plug and adaptor inserted within bayonet socket 49 as a unit.

The lamp cord 41 extending from pin plug 48 extends through a decorative cap, not shown, mounted on top of the lamp chamber 17 to feed a lamp supported by the cap. This feature will be further explained in connection with FIG. 14.

When the projector is turned on, socket adaptor 66 becomes energized, supplying power to lamp cord 41. When used as a lamp, the projector motor must be diasabled. If a special motor switch is not available on the projector, the motor must be disabled by a simple circuit modification depending on the design of the projector.

A special tool had been invented to aid in making the bayonet connection described in FIG. 11. Because of the restricted space within the lamp chamber 17, some difficulty may be experienced in making the connection directly by hand.

Figure 12:
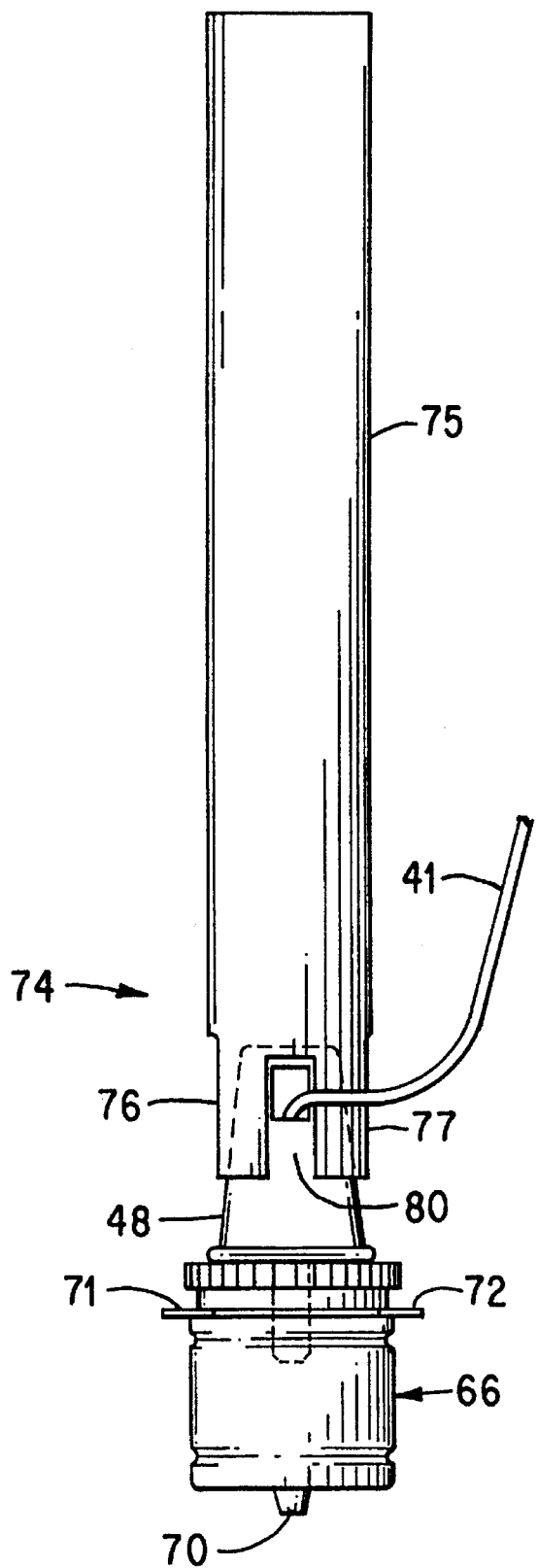
FIG. 12 is a tool for inserting the socket adaptor of FIGS. 8–10.
Figure 13:
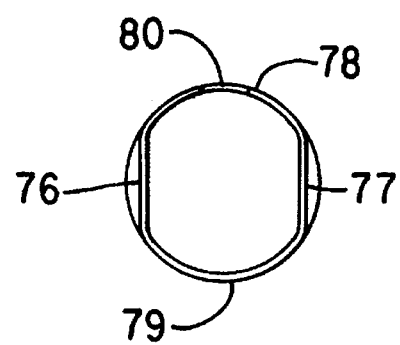
FIG. 13 is an end view of the FIG. 12 tool.

FIGS. 12 and 13 show a tool 74 which comprises a length of tubing 75 about 6 inches long and having an outside diameter of about ⅞ inch. The exact dimensions of the tube are not critical. One end of the tube is slightly flattened at 76 and 77 to form a cross section consisting of two flattened sides joined by two slightly shorter rounded sides 78 and 79. One of the rounded sides is slotted as at 80 to receive the lamp cord 41 extending from pin plug 48. The pin plug employed is of a conventional design having a generally rectangular body with the line cord extending from a top side portion.

In operation, the pin plug 48 is inserted into the modified socket adaptor 66. Tool 74 is then inserted over the pin plug to firmly grip the plug and socket adaptor as a unit with the lamp cord 41 extending out of slot 80. The tool with attached pin plug and socket adaptor is inserted in bayonet socket 49 and locked in place with a twisting motion as described in connection with the insertion of lamp 18 in FIG. 7.

Figure 14:
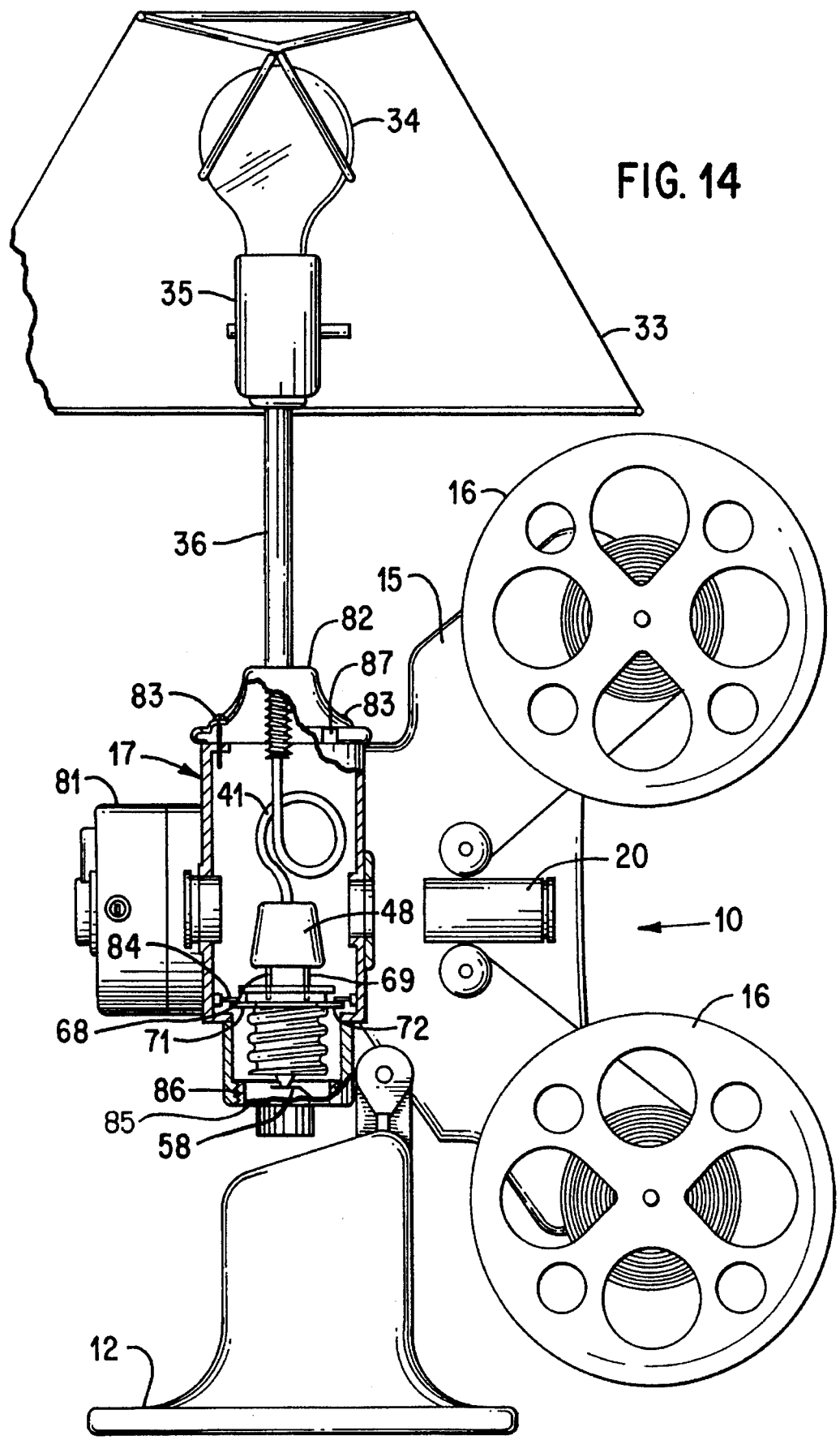
FIG. 14 is a view of the lamp chamber with parts broken away to show the electrical connection of the table lamp with a Model 8, Bell & Howell projector.

The threaded socket adaptor 66 can also be used in connection with systems other than a bayonet connection as, for example, the replacement for the bulb mounted in a Bell & Howell, Model 8 projector. FIG. 14 shows the Model 8 projector with its circular lamp chamber 17 broken away to disclose some interior details. Structure similar to the previous embodiments will be identified with the same reference numerals.

A projector body 10 is shown supported on a pedestal 12. A pair of support arms 15 project from one side of body 10 to support a film reel 16 at each end. A circular lamp chamber 17 is mounted on the projector body opposite the support arms. An electric motor 81 located on the body behind the lamp chamber is partially visible in FIG. 14.

A round cap normally situated on top of the lamp chamber, similar to cap 21 in FIG. 1, has been removed and replaced with a stylish lamp support 82 matching the lamp chamber. The lamp support is secured to the lamp chamber by means of screws 83 which screw into tapped holes provided in the lamp chamber. A support tube 36 extends upwardly from the lamp support 82 to carry a tamp switch 35, a bulb 34, and a lamp shade 33. A lamp cord 41 with a pin plug 48 extends into the chamber from below the cap with some extra slack for making a connection described below.

The base of the lamp chamber carries a flat conductive washer 84 electrically insulated from the body and serving as one electrical feed. A bottom cap 85 carrying spring urged contact 58 which serves as the second electrical feed is threaded into the base of the lamp chamber 17 by means of screw threads 86. After bottom cap 85 is unscrewed, the pin plug is inserted into slots 68 and 69 and the modified socket adapter 66 is inserted from below within the hole in washer 84 so that flanges 71 and 72 abut the bottom of the washer. Bottom cap 85 is then screwed into place to secure the connection. It should be noted that a continuous circular flange may be employed here instead of the spaced flanges 71 and 72.

The completed assembly is shown in FIG. 14 where the pin plug 4S is supplied with power from the internal wiring of the projector acting through washer 84 and contact 58.

In the event there is a malfunction of the internal electric feed of the projector, the lamp support 82 can be notched as at 87 so that the lamp cord can extend externally to a separate power source.

What is claimed is:

1. A combined motion picture projector and table lamp, said motion picture projector comprising a pedestal, a projector body supported on said pedestal in a substantially vertical position, a pair of support arms extending in a generally vertical position from one side of said projector body, a film reel mounted on an end portion of each said support arms, a projector lamp chamber mounted on a side of said projector body remote from said side carrying said support arms, said projection lamp chamber comprising a hollow container having a top and bottom, said table lamp comprising a mounting fixture, a tubular support having one end secured to said mounting fixture and the other end supporting a lamp socket, and means for attaching said mounting fixture to a top portion of said lamp chamber.

2. The combination of claim 1 including a lamp shade supported by said lamp socket, said tubular support having a length to support said shade above said projector.

3. The combination of claim 1 wherein said mounting fixture comprises an open claw structure having a generally planar upper surface, and a plurality of legs depending therefrom, a hole centrally located in said upper surface, said tubular support being coaxially mounted around said hole, said depending legs secured to a top portion of said lamp chamber; and a separate electrical lamp cord extending through said hole into said tubular support to supply power to said lamp socket.

4. The combination of claim 3 wherein the top of said projection lamp chamber comprises a mounting cover having ventilation slats on an upper surface thereof, the depending lugs of said claw structure being secured to said mounting cover so that said generally planar upper surface is spaced above said ventilation slats so as not to block the flow of air, and wherein said separate lamp cord extends between a top of the mounting cover and a bottom of said planar surface.

5. The combination of claim 4 wherein said projector is supplied with power through a recessed receptacle in the body of the projector, said recessed receptacle having two male internal prongs, an electrical adapter to enable said projector and said lamp to be supplied with power from a single electrical extension cord, said adapter comprising a straight insulating block having one end with two internal female connections and shaped to fit within said recessed receptacle wherein said prongs are inserted in said female connections, another end of said block having two male prongs projecting externally thereof and being electrically connected to respective internal female connections, said straight insulating block having a medially extending insulating enlargement, a second pair of female connections internally mounted within said enlargement and being in electrical contact with respective male and female connections in said straight insulating block, whereby when said extension cord from said lamp is inserted within the connections in the enlargement, and a female plug at an end of a power extension cord is plugged into said external prongs, power is supplied to both the lamp and the projector.

6. A combined motion picture projector and table lamp, said motion picture projector comprising a pedestal, a projector body supported on said pedestal in a substantially vertical position, a pair of support arms extending in a generally vertical direction from one side of said projector body, a film reel mounted on an end portion of each said support arms, a projection lamp chamber mounted on a side of said projector body remote from said side carrying said support arms, said projection lamp chamber comprising a hollow container having a top and bottom, a bayonet type electrical connector mounted on the bottom of the container and extending inwardly thereof, a cap mounted on the top of the container, said cap having a centrally located opening, a support tube secured around said opening and extending in a vertical direction, said table lamp being mounted on the free end of said support tube; and an electrical cord extending from said table lamp, through said support tube and cap into a lamp chamber interior.

7. The combination of claim 6 including a conventional pin plug mounted on an end of said electrical cord within the lamp chamber interior; and an electrical adapter for connecting said pin plug to said bayonet electrical connector.

8. The combination of claim 7 wherein said electrical adapter comprises a conventional two slot socket adapter having a bottom contact connected to one slot and a conductive sleeve connected to the other slot, a pair of opposed lateral bayonet flanges conductively attached to an upper portion of said sleeve whereby when said socket adapter is inserted within said bayonet connector and rotated, conductive contact is established between the bayonet connector and the slots of the adapter.

9. The combination of claim 8 including a hand tool to insert the two slot electrical adaptor and attached pin plug into the bayonet connector at a base of said lamp chamber, said hand tool comprising a tube having a length greater than the length of said lamp chamber, said tube having an end portion shaped to snugly engage and grip the body of the pin plug and an end slot of a length to permit the electrical cord to exit the tube whereby in use the top cap is removed, the pin plug inserted in the two slot electrical adapter, the tool end inserted over the body of the pin plug with the electrical cord extending outwardly through the end slot, and the adapter and pin plug is then pushed and rotated by the tool to make the bayonet connection.

10. The combination of claim 8 wherein said conductive sleeve is threaded.

11. The combination of claim 10 including a separate cylindrical sleeve, said opposed lateral bayonet flanges being integrally formed with said sleeve.

12. The combination of claim 8 wherein one of said bayonet flanges extends through a greater arc than the other.

13. The combination of claim 8 wherein a distance from a bottom of said bayonet flanges to a tip of said bottom contact is the same as the distance from a bottom of the bayonet flanges to a tip of the bottom contact in a bayonet type projection lamp.

14. A combined motion picture projector and area lamp, said motion picture projector comprising a pedestal, a projector body supported by said pedestal in a substantially vertical position, a projection lamp chamber mounted on said projector body, said projection lamp chamber comprising a hollow container having a top and bottom, an electrical connector mounted on the bottom of the container, a cap mounted on the top of the container, said cap having a centrally located opening, a support tube secured around said opening and extending in a vertical direction, said area lamp being mounted on a free end of said support tube, an electrical cord extending from said area lamp into a lamp chamber interior, a conventional pin plug mounted on an end of said electrical cord, and means to electrically connect said pin plug to said electrical connector.

15. The combination of claim 14 wherein the electrical connector comprises a conductive ring connected to one side of an AC supply, an insulated chamber extending below said conductive ring, an insulated closure screw threaded into a bottom of the insulated chamber, a contact mounted on the closure screw and connected to an other side of an AC line, and a conventional two slot socket adapter having a conductive sleeve and bottom contact, a flange secured to a top portion of the sleeve, said modified two slot socket adapter inserted in said insulated chamber so that said flange contacts an underside of said ring and said bottom contact of said two slot socket adapter contacts said contact on said closure screw.

16. The combination of claim 15 wherein said pin plug is inserted in said two slot socket adapter prior to the closure screw being screwed into said insulated chamber.

17. The combination of claim 15 wherein a distance from a bottom of said ring to a tip of said closure contact is a same distance from a top of the flange to a tip of the bottom contact in a flanged type projection lamp.

18. The combination of claim 15 wherein the flange secured to the top portion of said sleeve is a circular ring.

19. The combination of claim 14 wherein the cap mounted on the lamp chamber is circular in shape and is provided with an upraised central portion, said centrally located opening being located at a top of an upraised portion, and said support tube extending vertically therefrom to support said area lamp above said projector.

20. The combination of claim 19 including a notched portion at a base of the cap to provide an opening for the lamp cord to utilize an external source of power in an event of internal failure of the projector power supply.

* * * * *